No. 697,549. Patented Apr. 15, 1902.
J. N. SCHWALEN.
DRAFT EQUALIZER.
(Application filed Aug. 27, 1901.)
(No Model.)

WITNESSES:

INVENTOR
John N. Schwalen,
BY
his ATTORNEY.

UNITED STATES PATENT OFFICE.

JOHN N. SCHWALEN, OF HUDSON, WISCONSIN.

DRAFT-EQUALIZER.

SPECIFICATION forming part of Letters Patent No. 697,549, dated April 15, 1902.

Application filed August 27, 1901. Serial No. 73,421. (No model.)

*To all whom it may concern:*

Be it known that I, JOHN N. SCHWALEN, a citizen of the United States, residing at Hudson, in the county of St. Croix and State of Wisconsin, have invented certain new and useful Improvements in Draft-Equalizers, of which the following is a specification.

This invention relates to draft-equalizers; and it has for its object to provide a simple and improved device of this character which will effectively operate in all the purposes for which it is designed and which may be conveniently and easily adjusted to various conditions of use.

Figure 1:
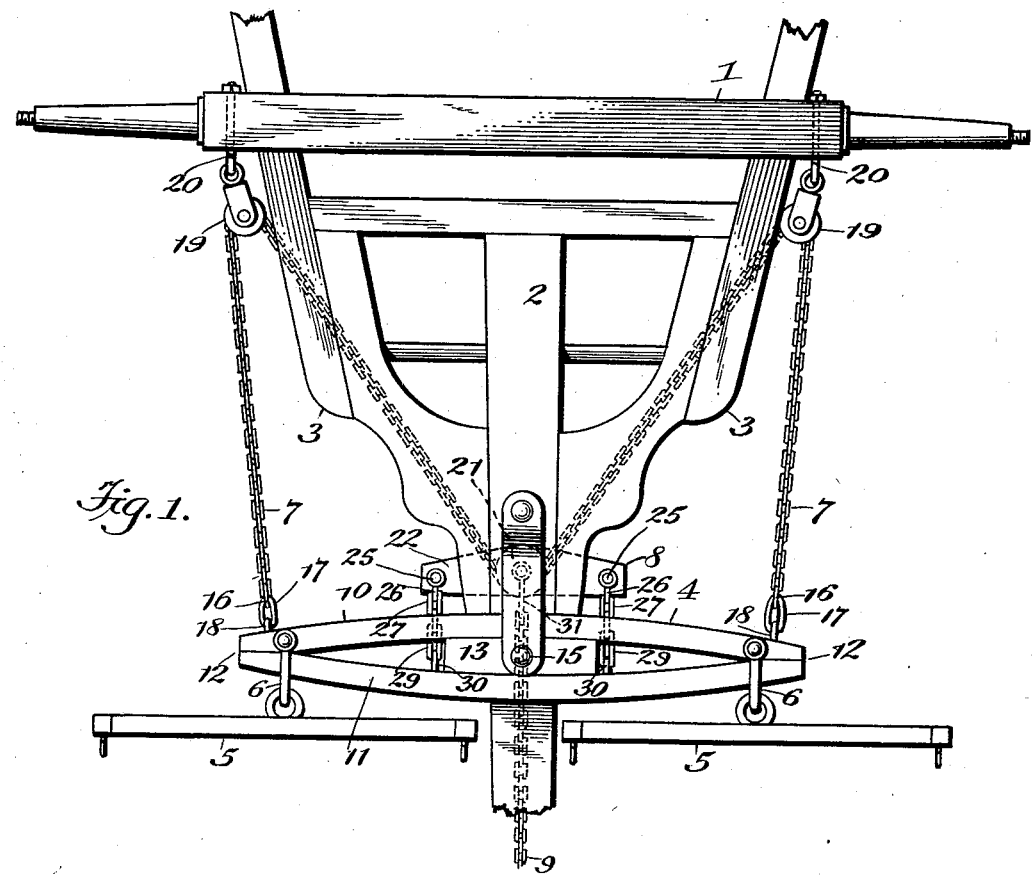
Figure 2:
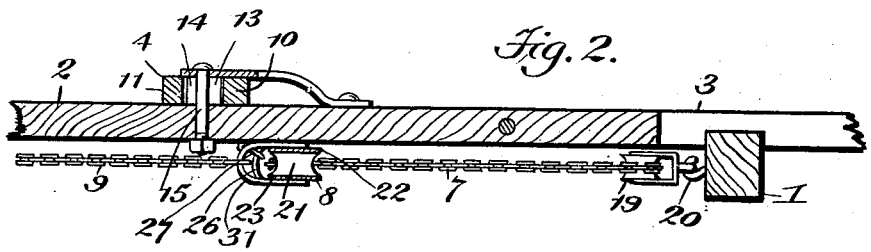
Figure 3:
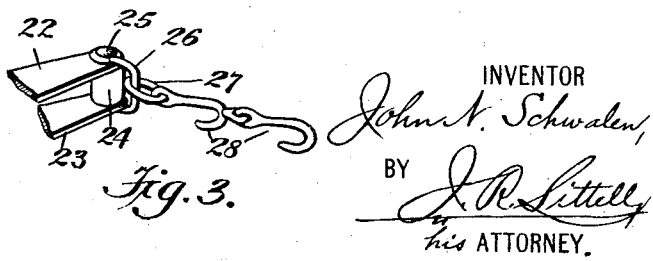

In the drawings, Figure 1 is a plan view of the draft-equalizer embodying my improvements. Fig. 2 is a detail sectional view taken longitudinally through the axle-pole. Fig. 3 is a detail view of one set of the adjusting-hooks and adjoining parts.

Corresponding parts in all the figures are denoted by the same reference characters.

Referring to the drawings, 1 designates the main axle of a wagon, agricultural machine, or other mobile vehicle, to which main axle is secured the inner end of the pole 2, the pole and axle being suitably maintained in braced relation by divergent braces 3.

4 designates the main evener or doubletree, to which the wheel-horses are hitched by means of the singletrees 5, which are connected with the ends of the main evener by means of clevis devices 6. The equalizing-chain 7 is connected with the main evener 4 at the ends of the same and is loosely connected with the main axle 1 and with a supplemental evener 8, which is connected with the main evener 4. The supplemental evener 8 is provided with a draft-chain 9, which is carried forwardly in alinement with the pole 2 and forms the hitching connection for the lead-horses.

In the preferred form of construction the main evener 4 consists of two longitudinally outwardly or oppositely bowed members 10 and 11, respectively, which members are connected at their ends, as at 12, and are spaced apart at their central portions by a transverse member or block 13, in which is formed an elongated slot 14, through which passes the draw pin or bolt 15, which is secured to the pole 2. The elongated slot is so formed as to permit of movement of the main evener 4 rearwardly and forwardly to a predetermined extent.

The equalizing-chain 7 is provided at its ends with hooks 16, which are engaged with elongated rings 17, which in turn are connected with eyebolts 18, secured to the end portions of the main evener at the rear thereof and passed about pulleys 19, carried by hooks 20, carried by the main axle 1 at the opposite ends of the same, and also about a pulley 21, carried by the supplemental evener 8.

The supplemental evener 8 consists, in the preferred form of construction, of two longitudinal members 22 and 23, respectively, a top member and a bottom member, which are spaced apart at their ends by blocks 24, through which and through the members 22 and 23 pass headed pins 25, about the ends of which are hooked the ends of hooks 26, with which are connected, respectively, two of the ends of supplemental equalizing-chains 27, the other ends of which carry each a plurality of spaced hooks 28, which are engaged properly with elongated rings 29, connected with eyebolts 30, secured to the main evener 4 at either side of the tongue 1. By engaging the proper hooks 28 of the respective chains 27 with the elongated rings 29 the proper relative adjustment of the main and supplemental eveners may be effected to draw the main evener rearwardly sufficiently to take the strain of the same off from the bolt or pin 15 and bring the said strain entirely upon the hooks 20 and the main axle 1.

The draft-chain 9 is connected with the supplemental evener 8 by a link 31, which is connected at its ends with the members 22 and 23 of the supplemental evener and centrally of the same.

The operation and advantages of my improved draft-equalizer will be readily understood. All the strain brought to bear upon the singletrees 6 by the wheel-horses is imparted to the main axle 1 through the medium of the main evener 4 and supplemental evener 8 and the equalizing-chain 7, and all the strain of the lead horses is imparted to the main axle 1 through the medium of the draft-chain 9, the supplemental evener 8, and the equalizing-chain 7. It will be noted, therefore, that all the operative strain which serves to move the vehicle through the medium of stress imparted to the main axle 1 is brought to bear upon said main axle through the agency of the equalizing-chain 7, which is operatively connected with the ends of the main evener and with the supplemental evener, so as to effectually equalize the draft at all points. None of the strain of the draft-animals is brought to bear directly upon the pole 2 through the medium of the pin or bolt 15, as the chain connection between the supplemental evener and the main evener is susceptible of regulation by alternate use of the hooks 28, so as to maintain the main evener in proper rearwardly-drawn position to prevent direct actuation of the pole 2 through the medium of the main evener and the pin or bolt 15. The vehicle is thus directly actuated through the medium of the main axle 1, and because of the equalized operative strain or draft upon the main axle 1 the pole 2 is prevented from lateral oscillation or wabbling and the consequent interference of the same with the draft-animals. The equalizing-chain 7 moves freely about the pulleys 19 and 21 in the performance of its equalizing office. The formation of the main evener 4, consisting of the outwardly and oppositely bowed longitudinal members 10 and 11 and the interposed transverse member 13, is superior in point of rigidity and strain resistance, as well as comparatively light in weight.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly falls within the scope of my invention and the terms of the following claims.

Having thus described my invention, I claim and desire to secure by Letters Patent—

1. An improved draft-equalizer of the class described, comprising, in combination with the vehicle-axle and the pole connected therewith, a doubletree having an elongated transverse slot in the center through which it is pivotally mounted on the pole, singletrees connected with the ends of the doubletree, pulleys secured to the axle, a pulley having an elongated block adjustably connected at each end with the doubletree, and a chain passing around said pulleys and secured at its ends to the ends of the doubletree.

2. An improved draft-equalizer of the class described, comprising, in combination with the vehicle-axle and the pole connected therewith, a doubletree having an elongated transverse slot in the center through which it is pivotally mounted on the pole, singletrees connected with the ends of the doubletree, pulleys secured to the axle, a pulley having an elongated block adjustably connected at each end with the doubletree, a chain passing around said pulleys and secured at its ends to the ends of the doubletree, and draft means connected with the elongated block and extending forward.

In testimony whereof I have signed my name in the presence of the subscribing witnesses.

JOHN N. SCHWALEN.

Witnesses:
D. E. HANNA,
M. KEELEY.